United States Patent [19]

Flynn

[11] 4,115,052
[45] Sep. 19, 1978

[54] WEB STOCK TREATING OVEN

[75] Inventor: Charles S. Flynn, Muskegon, Mich.

[73] Assignee: Blu-Surf, Inc., Muskegon, Mich.

[21] Appl. No.: 811,584

[22] Filed: Jun. 30, 1977

[51] Int. Cl.² .................................................. F23J 5/04
[52] U.S. Cl. ........................................ 432/72; 34/35;
34/158; 432/222
[58] Field of Search ................... 432/222, 72; 34/35,
34/158

[56] References Cited

U.S. PATENT DOCUMENTS

| | | | |
|---|---|---|---|
| 1,603,760 | 10/1926 | Furkert | 34/35 |
| 2,083,141 | 6/1937 | Buck | 34/158 |
| 3,436,065 | 4/1969 | Flynn | 432/9 |
| 3,472,498 | 10/1969 | Price et al. | 432/72 |
| 3,744,963 | 7/1973 | Flynn | 432/57 |
| 3,882,612 | 5/1975 | Trsi et al. | 432/72 |
| 3,917,444 | 11/1975 | Cathew | 34/35 |

*Primary Examiner*—John J. Camby
*Attorney, Agent, or Firm*—Price, Heneveld, Huizenga & Cooper

[57] ABSTRACT

Oven apparatus for heat treating web stock, especially a tentor for treating textile fabric, to remove volatile, combustible substances therefrom. The oven has a preheating entry section, a post-heating exit section, and intermediate sections, there being partial flow of gaseous materials from the intermediate sections to an incinerator outside of the oven chamber, and then to the entry and/or exit sections, and partial recirculatory flow by-passing the incinerator and propelled back to the intermediate sections, with the intermediate sections operating at a negative pressure relative to the entry and exit sections.

8 Claims, 4 Drawing Figures

WEB STOCK TREATING OVEN

BACKGROUND OF THE INVENTION

This invention relates to an oven for treating web stock, especially textile stock in a tentor frame, and more particularly to such having unique flow control of gaseous materials.

In the typical treatment of textile fabric during manufacture thereof, a generally continuous web of fabric is ultimately passed through a tentor frame for stretching and drying of the textile held by tentor hooks or the equivalent along the edges of the web. Heated gases are forced over and through the stretched fabric in substantial volumes for drying. During this process, the temperature of the gases must be limited to a predetermined maximum to avoid damage to the fabric due to overheating during drying or during the post-drying heat treatment. Consequently, it is typically necessary to have several tentor frame dryer sections in series to achieve effective drying and post-drying heat treatment. Such equipment requires substantial capital outlay, space, and heat input. A great share of this generated heat is exhausted to the atmosphere and lost in the volumes of gases discharged. These gases are laden with varying amounts of liquids removed from the fabric during drying. When processing double knit fabrics, such liquids typically include oily compounds deposited on the fabric during the previous knitting operation, solvents, and carriers for the dyes. These are carried by the drying gases, in minute form and often partially combusted, into the atmosphere as smoke and fine mist. This of course is not ecologically desirable. Furthermore, some of the oily substance has a tendency to condense and coat the equipment interior and cause potential problems and fabric damage.

In sum, it is recognized in the trade that present tentor dryer equipment, though effective, is expensive and moreover is space consuming because of the number required. Not only the fabric mills, but also the public in general is encumbered with higher fuel costs and fabric costs due to the tremendous quantities of fuel necessary for the tentor dryers. And the public also has the ecological disadvantage of undesirable stack discharges. Though such discharges are questionable as to meeting governmental guidelines, the mills have not heretofore had available to them tentor dryers that are effective in this regard. The invention herein therefore endeavored to devise and develop an oven system which would cause more efficient and rapid drying and heat treatment of web stock, particularly textile fabric in a tentor, using less fuel and less equipment, and resulting in ecologically improved, controlled stack discharge. This was done by converting an existing tentor to incorporate the new concept. The converted apparatus, set forth in the inventor's copending application Ser. No. 811,583, filed June 30, 1977, and entitled TENTOR, is proving to be a significant advance over the apparatus otherwise used. The inventor then undertook to devise and develop unique apparatus which would replace present equipment.

SUMMARY OF THE INVENTION

The present invention employs a multiple section oven, such as a textile tentor, that includes an entry section, at least one intermediate section, and an exit section, having unique gaseous flow recirculation and heat generating incineration with the intermediate oven sections operating under negative pressure relative to the entry and/or exit sections. The oven sections collectively form an oven chamber through which web stock containing volatile combustible materials advances sequentially under dynamic gaseous flow conditions. Volatile combustible gases are driven off the web stock and drawn off from the intermediate oven sections, with one portion of the gases being recirculated back to the intermediate sections and the other portion being propelled into an incineration combustion burner to generate hot combustion gases. These hot gases are propelled into the entry and/or exit oven sections for web preheating, web post-heating, and positive pressure generation causing recirculatory flow back into the intermediate oven sections.

The constant recirculation and passage of a portion of the gases through the combustion burner minimizes the quantity of exhausted gases, effects incineration of sufficient amounts of recirculated gases to prevent build-up of combustible vapors to an explosive mixture, causes re-use of incinerated heated gases, achieves high mass velocity of gases with a minimum volume of cold air being introduced, and allows flexibility in choice of fuel.

DESCRIPTION OF THE PREFERRED EMBODIMENT

Figure 1:
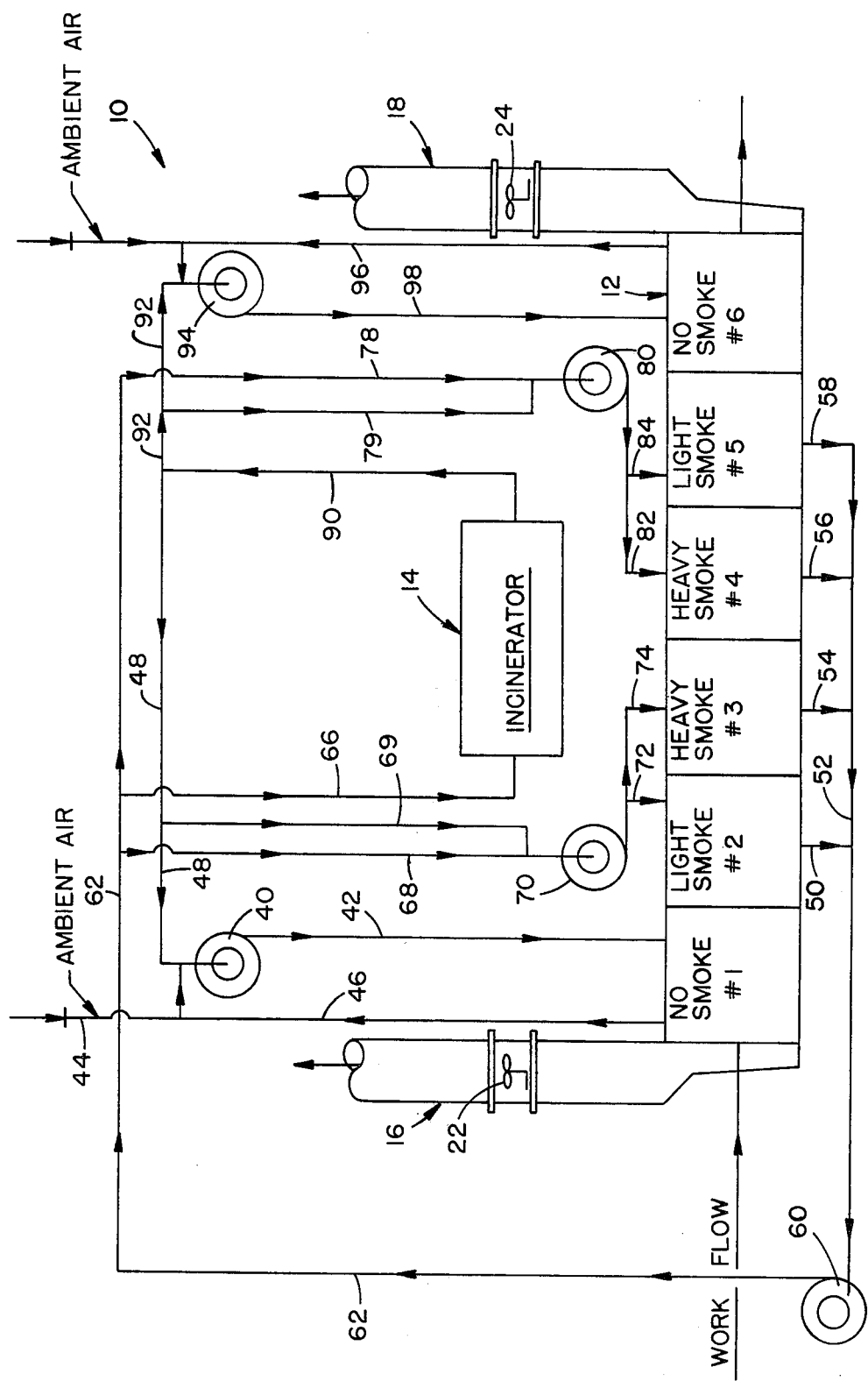
FIG. 1 is a schematic diagram of the novel assembly.

Referring specifically to the drawings, in FIG. 1 is depicted an illustrative assembly of the novel apparatus 10 including a multiple section oven subassembly 12, incinerator 14, exhaust stack units 16 and 18, and a cooperative system of ducting and air propelling blower units.

Oven 12 is shown to include an entry section at one end, indicated as number 1, an exit section at the opposite end, indicated as number 6, and a plurality of intermediate sections therebetween, indicated as numbers 2–5. The specific number of oven sections can vary considerably to suit the particular usage and requirements. These sections, which may for example each be 10 feet in length, collectively form an internal oven chamber through which the web stock or work advances progressively as indicated by the arrow, moving sequentially into and through section 1 and then successively through all of the sections until exiting from section 6.

Exhaust stack unit 16 with its particular blower and motor unit 22 is at the entry section, while exhaust stack unit 18 with its blower and motor unit 24 is at the exit section. The special gaseous flow character of the apparatus removes the necessity of having an exhaust stack at each of the other oven sections, and in fact even the exhaust through stacks 16 and 18 constitutes a mixture of ambient air and combustion product gases, basically free of combustible gases, presenting definite nonpolluting advantages.

The work material as introduced into the oven, contains or includes volatile combustible substances such as oils, solvents, and other organic compounds. The present invention was conceived for the chief purpose of drying and heat treating of textile stock, being particularly useful for this purpose. The volatile, combustible materials on textile fabric such as double-knit polyester fabric, typically includes moisture in an amount of about 15 to 40% by weight of the textile, as well as oils and solvents such as needle oil, sludge solvents, metallic cleaners, and other organic compounds. The novel apparatus operates uniquely to minimize fuel comsumption and minimize pollution while increasing product throughput. The concept could be adapted to heat treat other web stock also where combustible pollutants are driven off the stock, e.g. paper, wood, polymer stock and the like but will be largely explained relative to textile fabric for convenience.

The manufacture of cloth fabric at textile mills typically involves use of a tentor or tentor frame by which the fabric is stretched and advanced. In this type of operation, temperatures of 350° F. to 375° F. should not be exceeded, to avoid damage to the fabric by fusion or the like. As the polyester knit cloth is dried in the conventional tentor, smoke is emitted as a result of the oils and solvents present in the cloth being volatilized therefrom by the heated drying gases. Some of this oily material recondenses inside the tentor housing, some of it recondenses on the roof areas of the building at the stacks, and some is ejected into the atmosphere as smoke to the disadvantage of personnel, plants, and structures in the area. The degree of effectiveness of conventional tentors in drying and heat treating cloth is dependent upon flow of vast quantities of hot gases. The gases are heated to approximately 350° F. to 375° F., passed over the stock, and exhausted at temperatures of approximately 250° F.

These tentor units are typically formed of 10 foot length sections, each several feet wide. The fabric is stretched, for example, from a width of about 48 inches to about 63 inches or so, during which and subsequent to which several pounds of water per minute are evaporated for lowering the moisture content from about 15 to 40% by weight to only a few percent. This also results in evaporation of substantial quantities of knitting oil (light machine oil), solvents, dye carriers and other chemicals from the fabric. The discharge from these tentor units results in tremendous heat loss up the stack. Increased fuel costs in recent years has rendered these heat losses very serious. Further, meeting recent pollution control standards has been all but impossible with equipment heretofore available to the textile mills.

The inventor herein, as set forth in copending application Ser. No. 811,583 identified above, experimented on a conversion tentor for several months, using a gaseous flow system which constituted a significant improvement over the prior art. The arrangement, apparatus, and flow system of the present assembly described herein constitute an improvement over the conversion unit. The apparatus employs exhaust stacks only at both ends of the oven, with the volatilized combustible materials being retained in the intermediate sections of the oven for eventual passage through the incinerator where they are converted to hot combustion product gases controllably recirculated in a special manner to assure vaporization of the undesired materials from the textile at a controlled temperature range, and combustion thereof with retention of the resulting heat for further vaporization and without the volatilized substances being exhausted to the ambient atmosphere.

In the depicted illustrative version of the invention, each of the six sections or zones is preferably of a length of about 10 feet. Each has a housing of generally rectangular cross section, suitably lined with insulation and sealed against leakage to the adjacent housing or housings to collectively form an elongated internal chamber extending from the inlet end to the outlet end of the oven. The web stock that passes through the chamber is straddled above and below in each oven section by a series of hot gas manifold pipes 30 (FIGS. 2 and 3) which project laterally, i.e. transversely of the stock direction of travel. From orifices in these manifold pipes, hot gases are ejected downwardly and upwardly onto and through the fabric stock held in a stretched condition by typical tentor hooks or the equivalent. Manifolds 32 for pipes 30 are in flow communication with input ducts. The manifolds for the entry and exit oven sections are arranged to receive a mixture of controlled quantities of cool ambient air, recirculated oven gases, and hot incinerator gases. The inlets to the manifold for the intermediate oven sections receive a mixture of regulated amounts of recirculated oven gases and hot incinerator gases, in a controlled fashion.

Dynamic flow at the oven entry section 1 is by means of gas propelling blower 40 through duct 42. The input feed to blower 40 includes regulated quantities of three gases, namely ambient air through duct 44, recirculated oven gases through duct 46, and hot incinerator discharge gases through conduit 48.

The mixed hot gases emitted from the manifold pipes at about 400° F. or so engage and pass through, over, and around the moving stretched fabric web to evaporate vaporizable material and become laden therewith. In the first oven section this material is primarily water, i.e. moisture, because the temperature in this section is high enough to evaporate water but the large amount of water evaporation prevents the temperature of the material from rising over the boiling point of water. This moisture laden gas basically departs from the oven entry section in three ways. Firstly, a substantial portion of it departs through the duct 46 to be recirculated through blower 40 back into the entry section of the oven through duct 42. Another portion of it is caused to flow directly to the intermediate oven sections 2, 3, 4 and 5, particularly 2 and 3, because of a pressure differential between the lower pressure in the intermediate oven sections and the higher pressure in the entry oven section, for reasons to be explained more fully hereinafter. Thirdly, some of the gases with moisture and ambient air are discharged through the stack 16. This discharge constitutes essentially clean, i.e. nonpolluting discharge. Since the temperature in this first section will typically be elevated to only approximately the boiling point of water, practically no smoke from evaporated organic materials will be encountered from this section.

As the material progresses through the second section which has a gaseous temperature of about 360° F., the material temperature will rise from the boiling point of water to around 275° F. or so with some organic materials being evaporated to create combustible vapors. The gaseous materials in section 2 will be constantly drawn off through duct 50 and into duct 52 where they join the gaseous discharge from sections 3, 4 and 5 being drawn off through ducts 54, 56 and 58, all flowing to blower 60 and from thence, propelled into duct 62. During product movement from oven section 2 to oven section 3 and through the latter, its temperature rises to over about 300° F., such that a great deal of organic material is evaporated to cause visible heavy smoke. The gaseous temperature in section 3 is about 360° F. With passage of the material into section 4 having a gaseous temperature of about 360° F., further temperature rise to about 325° F. up to about 340° F. occurs with additional organic materials being volatilized. Thus, heavy smoke is visible in section 4. In section 5, where the gaseous temperature is about 360° F., the temperature of the material rises a further small amount, approaching 350° F., with a small amount of smoke being visible as a result of residual organic compounds being volatilized.

The combined gases flowing from sections 2, 3, 4 and 5 into duct 52, blower 60 and duct 62 are caused to partially flow to incinerator 14 and partially to be recycled directly back to these sections without incineration. More specifically, duct 62 branches to cause part of the gases to flow into duct 66 to incinerator 14, with the other part being split into ducts 68 and 78 for recirculation back to the intermediate oven sections. Duct 68 communicates with blower 70 which propels the gases through ducts 72 and 74 to sections 2 and 3 respectively. Duct 78 communicates with blower 80 which propels the gases to ducts 82 and 84 for sections 4 and 5 respectively.

The gases that are conducted through duct 66 into incinerator 14 are combusted, with the temperatures in the incinerator preferably being in the range of around 1300° F. to 1400° F., sometimes being up to 1800° F., and almost always above 500° F. or 600° F., because, although the oils typically have a kindling temperature below 500°–600° F., the common organic dye carriers have kindling temperatures above 500° F. Temperatures this high cannot be tolerated in the oven itself since this would seriously damage the material being treated, particularly textile material. The gases are incinerated by being exposed in front of an elongated high velocity burner assembly of the type set forth at FIG. 3 and described in column 6, second form, of U.S. Pat. No. 3,436,065, and also at 38 in U.S. Pat. No. 3,744,963, specifically incorporated by reference herein. The burner assembly is supplied with a mixture of gaseous fuel and air causing combustion of the vaporized combustible oils and solvents from the oven. This mixture of hot gases at combustion range temperatures is discharged from the incinerator and conducted through duct 90 from whence one portion flows through duct 48 to blower 40, another portion flows through duct 48 and duct 69 to blower 70, another flows through duct 92 to blower 94, and a fourth portion flows through duct 92 and duct 79 to blower 80. Blower 94 also receives recirculatory gases from exit oven section 6 through duct 96, with the mixture of gases from ducts 92 and 96 being passed through blower 94 and propelled through duct 98 back into oven section 6. This exit oven section also operates at a slight positive pressure relative to the intermediate oven sections.

By the time the stock moves into the exit oven section 6, the moisture and vaporizable materials are removed, this oven section being used primarily for a post heat treatment. The temperature of the gases is about 360° F. and the temperature of stock at this point is at the maximum desired, i.e. typically around 350° F. for a polyester textile fabric. No smoke is expected to be evidenced at this section as the volatiles are already removed. The continuously recirculated gases in this section advance in three directions, with part of it flowing directly back into the intermediate oven sections, particularly 4 and 5, because of the pressure differential, part being recirculated through duct 96, blower 94 and duct 98, and back into section 6 mixed with incinerator gases, and the third part being exhausted up stack 18 in a clean nonpolluting form.

The negative pressure in the intermediate sections is basically caused by removing more gases therefrom through the ducts than are returned through the ducts, i.e. recirculating back to those sections only part of the gases withdrawn therefrom at any one time interval, the remainder being directed on to the incinerator. Even though only part of the gases are directed to the incinerator at any one time, the entire quantity of gases in the intermediate chambers will be sequentially incinerated within a matter of minutes.

Figure 2:
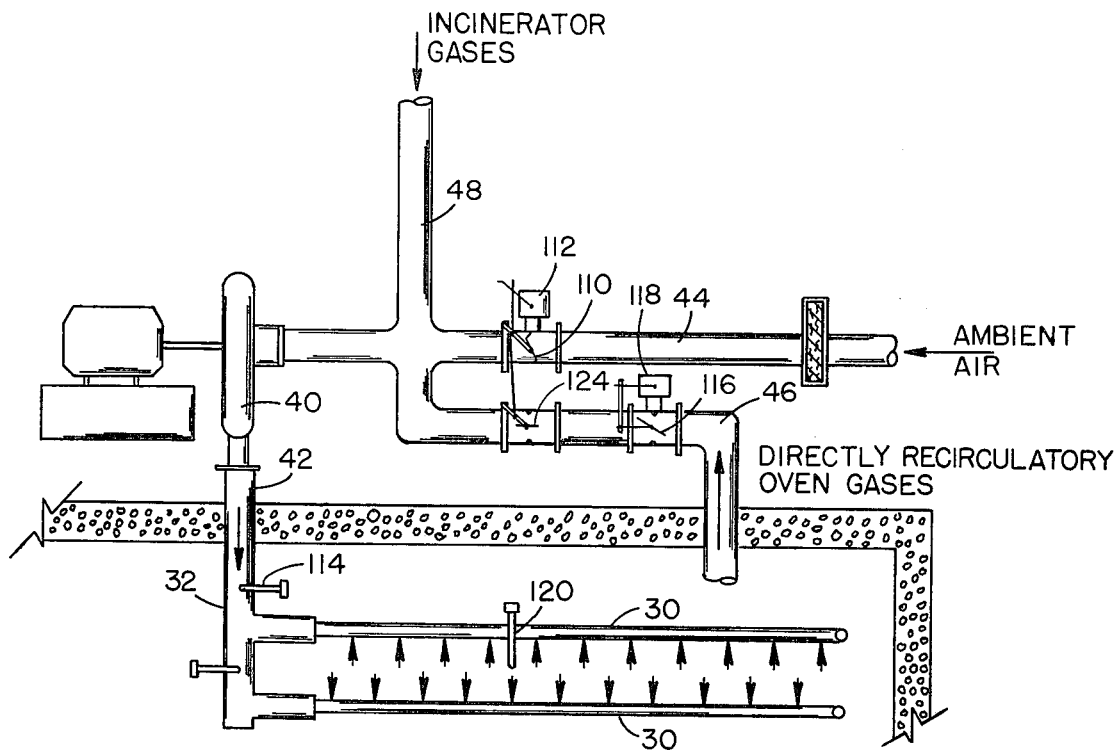
FIG. 2 is an enlarged schematic of the entry and exit sections of the oven.

Control of the temperature in the entry and exit sections of the oven is achieved by regulating the relative quantities of (a) incinerator gases at temperatures in the range of 1400° F., (b) recirculated oven gases at temperatures in the range of about 350° F. to 400° F., and (c) ambient air at temperatures less than about 100° F., mixed together. Referring to FIG. 2, the mixture of the controlled quantities of these three types of gases enter blower 40 from the individual conduits 48, 44 and 46. The amount of ambient air through duct 44 is regulated by a normally closed modulating damper 110 interconnected with actuator 112 which is governed by a temperature sensor 114 on manifold 32. Thus, the modulating damper controls the amount of ambient air which will pass to sections 1 and 6, such opening only when the temperature rises above a predetermined set temperature for recirculated air. The amount of intermediate temperature oven air recirculated through duct 46 is controlled in two fashions. Firstly, a damper 116 operated by actuator 118 responsive to a temperature sensor 120 at manifold pipe 30, is normally open but can close controlled amounts if the temperature in the oven drops below a predetermined value, thus causing a higher percentage of the hotter incineration gases to be in the inflowing mixture. A second damper 124 in duct 46 is interconnected with the damper mechanism for ambient air damper 110, with damper 124 being normally open, and closing with opening of damper 110. To be certain that the ratio of organic carrier to air is well below the explosive range, sufficient gas is recirculated to the burner for combustion of the carrier to keep the ratio in the range of about 3 to 1 up to 20 to 1 of air to carrier.

Figure 3:
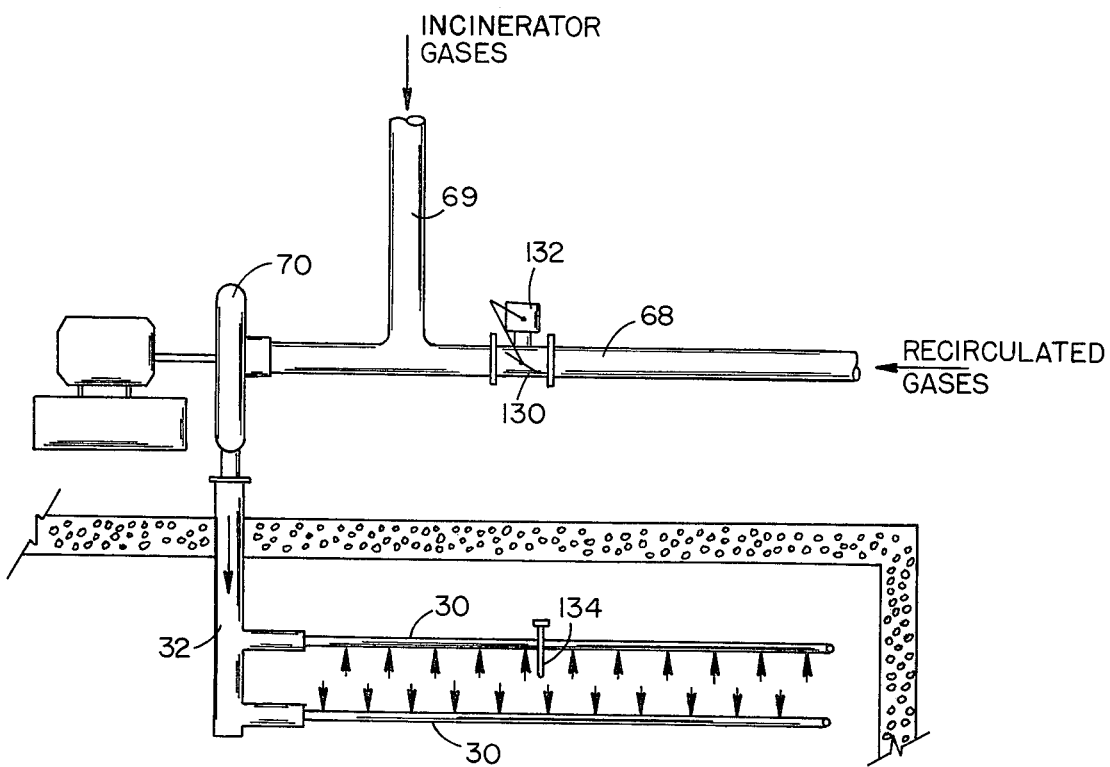
FIG. 3 is an enlarged schematic of an intermediate section of the oven.

The temperature in the intermediate oven sections is controlled on a simpler system, with that for sections 2 and 3 being depicted in FIG. 3. Specifically, the blowers 70 propel into the manifold the gases received from the two ducts 68 and 69 and recirculated oven air from duct 68. A normally open damper 130 in duct 68 is operated by actuator 132 responsive to a temperature sensor 134 on pipes 30 in the oven, to regulate the amount of 350° F. to 400° F. recirculated oven gases mixed with the amount of 1400° F. Incinerator gases to achieve the controlled temperature.

Figure 4:
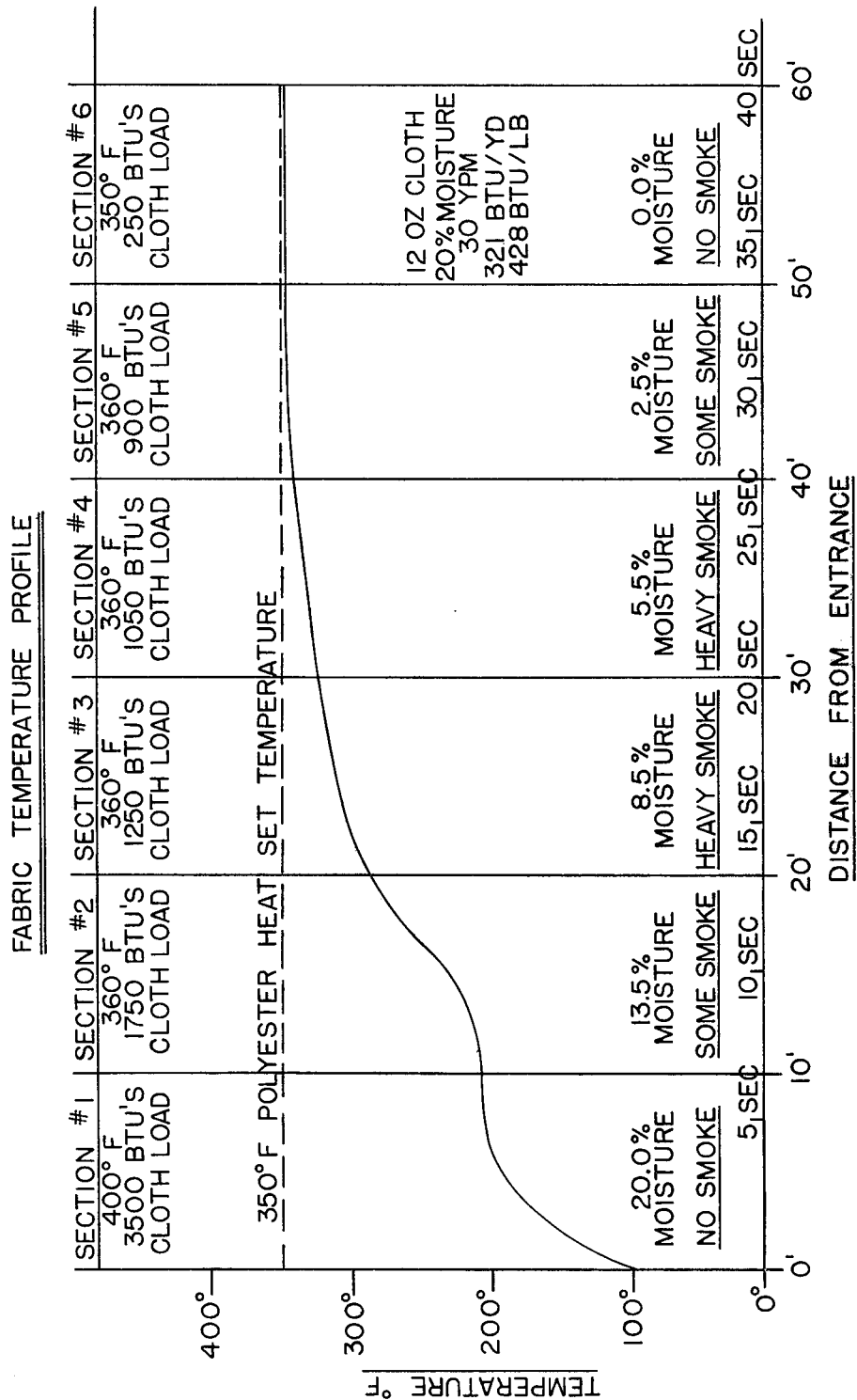
FIG. 4 is a temperature profile chart for a typical cloth stock as treated in the apparatus.

FIG. 4 is a chart representing a typical fabric temperature profile curve for cloth stock being treated in the apparatus. The example cloth is a 12 ounce polyester having a 20% moisture content as it enters the oven, being advanced at the rate of 30 yards per minute. To evaporate the moisture and organic volatiles and then heat set the cloth would require about 321 BTU per yard of cloth or about 428 BTU per pound of cloth. The temperature figures at the top of the chart indicate the gaseous temperatures in the designated oven sections for this particular stock.

Of course these temperatures will be somewhat different for each stock being treated, the important concept being the gaseous flow relationship for the oven sections relative to each other and relative to the incinerator.

The embodiments of the invention in which an exclusive property or privilege is claimed are defined as follows:

1. A multiple section oven apparatus for heat treating web stock to drive off volatilizable and combustible residual materials thereon, including an entry oven section, an exit oven section, and at least one intermediate oven section, with said sections forming an oven chamber;
    means for conveyance of web stock through said oven by passage into and through said entry oven section, through said intermediate oven sections, and through and out said exit oven section;
    incineration burner means outside said oven chamber;
    discharge duct means from said intermediate oven sections and gas propelling means for withdrawing laden gases from said intermediate oven sections through said discharge duct means; said discharge duct means having parallel flow branches for flow of one gaseous portion to said incineration burner means and flow of another gaseous portion back to said intermediate sections;
    ducting flow means from said incineration burner means to at least one of said entry oven and exit oven sections for conducting hot combustion gases to such whereby gases in said oven tend to flow toward said intermediate sections for continuous recirculation and combustion.

2. The oven apparatus in claim 1 including controlled fresh air inlet means to said burner means for regulated flow of fresh air thereto; and exhaust stack means from at least one of said oven entry and oven exit sections for exhaust of part of said combustion gases from said oven apparatus.

3. The oven apparatus in claim 2 including controlled recirculation means at said incineration burner means for regulated recirculation of part of said hot combustion gases back to said burner means for temperature control of gases discharged through said ducting flow means.

4. A multiple section oven for heat treating web stock to drive off volatilizable and combustible residual materials therefrom, including an entry oven section, an exit oven section, and at least one intermediate oven section;
    means for conveyance of web stock through said oven by passage into and through said entry oven section, through said intermediate oven sections, and through and out of said exit oven section; at least one of said oven sections having gaseous recycle means;
    said gaseous recycle means including gaseous outlet conduit means for conducting a stream of hot gases laden with volatilized materials from the oven, and gaseous return conduit means for returning gases back to said oven; incinerator means for increasing gaseous temperature by combusting volatilized materials in the gaseous stream;
    said incinerator means being in communication with said outlet conduit means and said return conduit means;
    and by-pass conduit means in parallel with said incinerator means, in communication with said outlet conduit means and said return conduit means, whereby a first portion of the laden gases is conducted through said incinerator means and a second portion by-passes said incinerator means;
    and control means regulating the relative flow volumes of said first and second portions.

5. The oven in claim 4 wherein said recycle means is connected to an intermediate oven section.

6. The oven in claim 4 wherein said control means is responsive to oven temperature to regulate relative flow volumes accordingly.

7. A multiple section oven for heat treating web stock to drive off volatilizable and combustible residual materials thereon, including an entry oven section, an exit oven section, and at least one intermediate oven section;
    gaseous outlet conduit means from said intermediate oven section for conducting a stream of hot gases laden with volatilized materials from the oven, and gaseous return conduit means for returning gases back to said intermediate section;
    incinerator means for increasing gaseous temperature by combusting volatilized materials in the gaseous stream, in communication with said outlet conduit means and said return conduit means;
    by-pass conduit means in parallel with said incinerator means, in communication with said outlet conduit means and said return conduit means whereby a first portion of laden gases is conducted through said incinerator means and a second portion by-passes said incinerator means;
    control means regulating the flow volume of said first and second portions;
    branch conduit means from said incinerator means to at least one of said entry and exit oven sections for conducting heated gases thereto, and exhaust means from said one section for discharge of exhaust gases.

8. The oven in claim 7 including fresh air conduit means to said one section; and regulator means for said fresh air conduit means and said branch conduit means responsive to temperature in said one section for regulating the relative flow volumes through said branch conduit means and said fresh air conduit means to control the temperature in said one section.

* * * * *